UNITED STATES PATENT OFFICE.

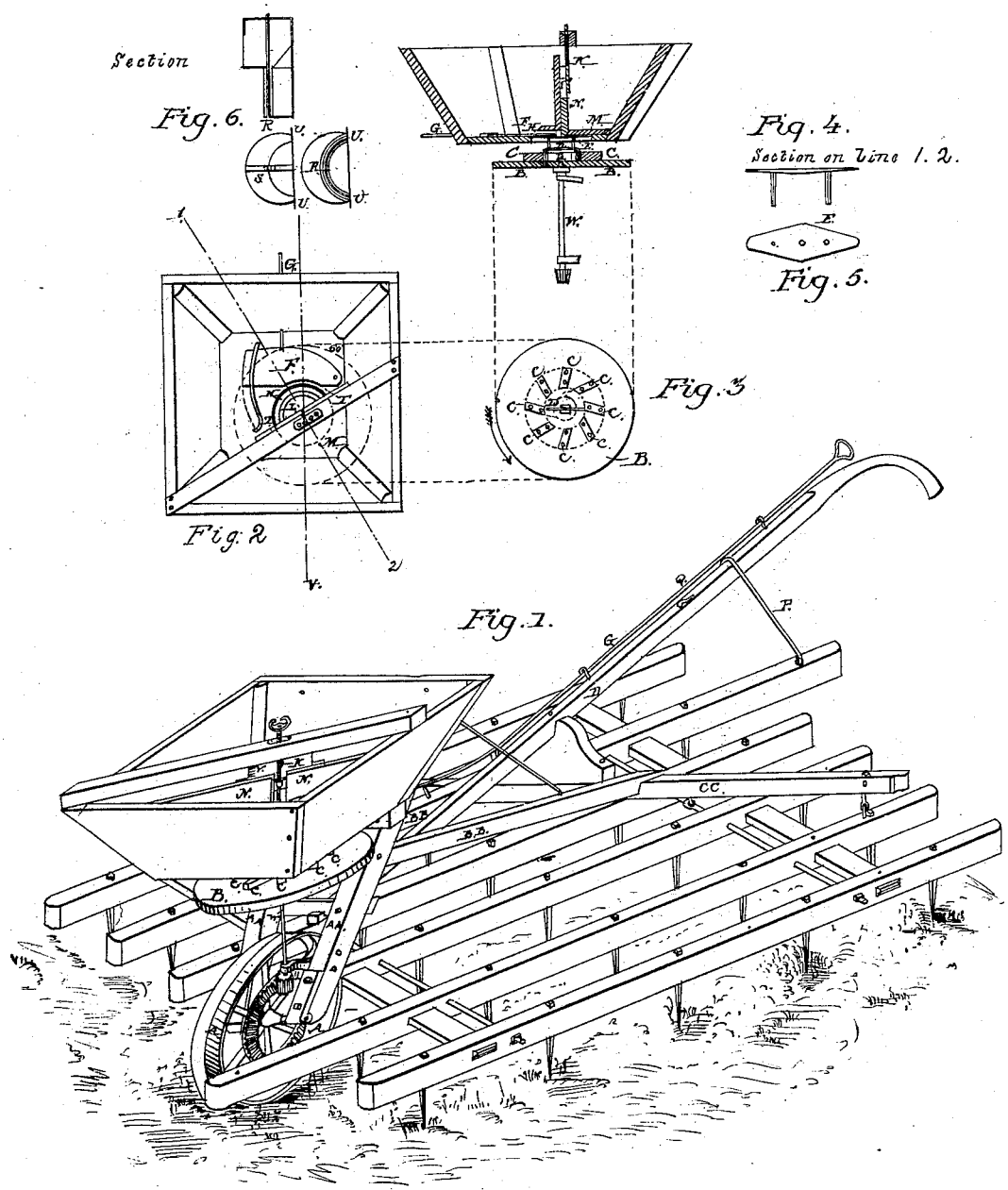

JOS. WALTON, OF DELAVAN, WISCONSIN.

IMPROVEMENT IN SEEDING-MACHINES.

Specification forming part of Letters Patent No. 21,995, dated November 2, 1858.

*To all whom it may concern:*

Be it known that I, JOSEPH WALTON, of Delavan, in the county of Walworth, in the State of Wisconsin, have invented a new and Improved Machine for Sowing Grains and Seed Broadcast; and I do hereby declare that the following is a full, clear, and exact description of the construction and operation of the same, reference being had to the annexed drawings, making a part of this specification, in which—

Figure 1 is a perspective view; Fig. 2, the hopper; Fig. 3, rotary disk; Fig. 4, section on line 1 2, Fig. 2; Fig. 5, the finger; Fig. 6, the small hopper for grass-seed.

The nature of my invention consists in the arrangement of parts hereinafter described.

To enable persons skilled in the art to make and use my invention, I will proceed to describe its construction and operation.

I mount the drive-wheel A, rotary disk B, and hopper upon any convenient frame in such a manner that the top surface of the disk B may be horizontal, or nearly so, when at work, and the center of the disk B directly beneath the throat L, Fig. 4, of the hopper. On the top surface of the disk B, I attach wings C C C, Figs. 1, 3, 4, with their outer edges tangent to a small circle, as shown in Fig. 3. The partition N N, Fig. 1, I place at an angle of sixty degrees with the line of draft, as shown by the dotted line with arrow-head in Fig. 2. The gate or valve H I, Figs. 2 and 4, for regulating the flow of grain from the hopper, I make with a semicircular disk three-sixteenths inch smaller than the throat L, which throat I make about six inches diameter. In the throat L, I place a finger, E, Figs. 4, 5, so as to revolve about a center attached to the partition N N, Fig. 4, with two studs beneath to take hold of the rod D, Figs. 3, 4, on the rotary disk B, that it may be turned with it. This should be placed near the top of the throat L. Its use is to prevent clogging with straw or chaff. On the back of the gate or valve H I can be marked a scale, Y, Fig. 1, to show at once the proper height to raise the gate for sowing any desired quantity of grain on a given space. The gate is raised or lowered by the screw K, Figs. 1, 2, 3. To shut off the grain entirely I use the slide F, operated by the rod G, Fig. 1, and to throw the whole machine out of work I lower the handle D D, Fig. 1, and throw the hook P over the hitch Q, which keeps the drive-wheel off the ground. The whole machine is attached to the harrow by the joints O O, Fig. 1, (only one of which is seen,) at any convenient point.

For sowing grass or clover seed with this machine, either alone or with other seed, I use a second hopper, Fig. 6, the throat R of which is made to suit the throat L in Fig. 4, and regulate the feed by the screens S, as shown in the section. This hopper I attach to the large hopper by sliding flanges into the grooves T T, Fig. 2.

I do not claim the sowing of grain broadcast by centrifugal force, nor combining a sowing-machine and a harrow, nor the sowing of two or more kinds of grains at one and the same time.

What I do claim is—

The rotary disk B, in combination with the throat L, the partitions N N, the valve H I, the finger E, and the grass-seed hopper, when the whole are arranged and combined for joint operation as above set forth.

JOSEPH WALTON.

Witnesses:
 LYMUS C. LUTHER,
 WARREN H. BARKER.